UNITED STATES PATENT OFFICE.

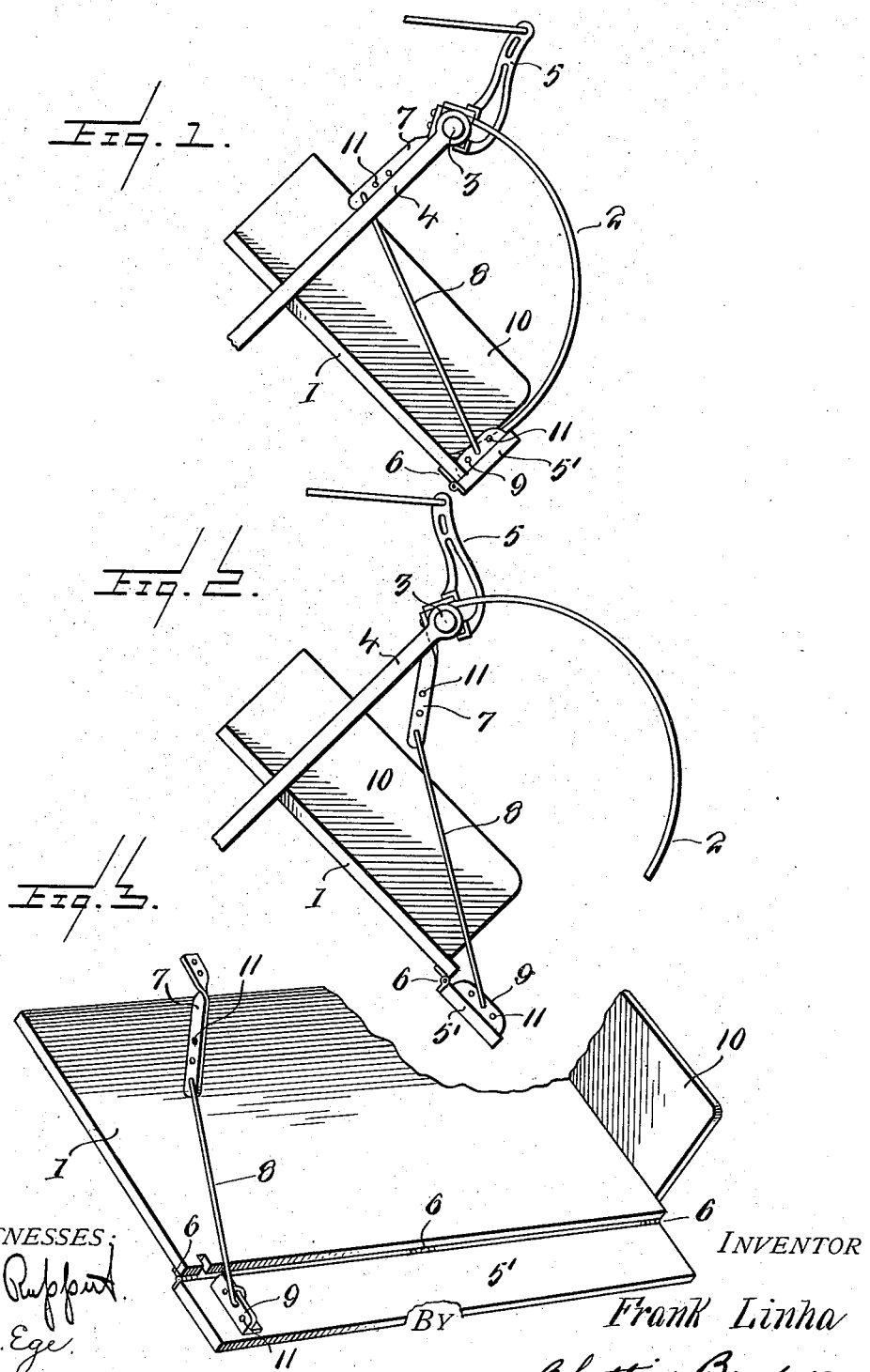

FRANK LINHA, OF MINOT, NORTH DAKOTA.

FLAX AND OTHER GRAIN ATTACHMENT FOR HARVESTERS.

1,023,113.  Specification of Letters Patent.  Patented Apr. 9, 1912.

Application filed December 27, 1910. Serial No. 599,635.

*To all whom it may concern:*

Be it known that I, FRANK LINHA, a citizen of the United States, residing at Minot, in the county of Ward and State of North Dakota, have invented certain new and useful Improvements in Flax and other Grain Attachments for Harvesters, of which the following is a specification.

This invention relates to grain harvesters and has special reference to improvements in flax and other grain attachments for such machines.

The invention has for its principal object to improve flax and other grain harvesting machines by providing means whereby practically all the loose flax or short cut grain will be saved and not scattered over the ground as the machine travels, as is the case with flax attachments now generally in use.

Another object of the invention is to provide a swinging leaf or draw board at the lower edge of the table on which the flax or other grain is gathered into a bunch by means of a set of curved teeth which are periodically raised by the driver to dump the collected flax or other grain bunch, the said leaf being disposed outwardly or below the said teeth so that the loose flax or grain heads will be prevented from dropping off the table between adjacent teeth, and by means of suitable operating connections between the shaft of the teeth and the said draw board or leaf, the latter can be let down or opened at the same time the teeth are moved to open position, with the result that the loose flax or grain will drop off the table at the same time the bunch is deposited on the ground.

With these objects in view and others, as will appear as the description proceeds, the invention comprises the various novel features of construction and arrangement of parts which will be more fully described hereinafter and set forth with particularity in the claims appended hereto.

In the accompanying drawing, which illustrates one embodiment of the invention, Figure 1 is a side view of the inclined discharge table of a flax and other grain attachment for a harvester with the improvements applied thereto, the leaf or draw board being shown raised and in operative position to collect the loose flax or other grain. Fig. 2 is a similar view showing the parts in a position to deposit the flax or other grain upon the ground. Fig. 3 is a perspective view of a portion of the inclined table showing the invention applied thereto.

Similar reference characters are employed to designate corresponding parts throughout the views.

As the present invention relates solely to the discharge table of a harvester and more particularly to improvements in a flax and other grain attachment for harvesters, it has been deemed unnecessary to illustrate the harvester. The flax and other grain attachment includes an inclined discharge table 1 that is arranged in coöperative relation with the elevating mechanism of the harvester so that the flax or other grain will be delivered to the top of the table and slide down the same toward the lower edge where it is arrested by a set of curved collecting teeth 2 which are arranged side by side and have their upper ends anchored in a horizontal shaft 3 that is journaled in fixed arms 4, arranged at the ends of the table and suitably fastened to the harvester frame. In the drawing, only the end tooth 2 of the grain-holding teeth is shown, as the other teeth are concealed from view behind the forward one, but it is to be understood that a plurality of teeth are used in spaced relation, as is common in flax attachments. Only one supporting arm 4 is shown in the present instance, as one arm is concealed behind the other. The lower ends of the teeth 2 are adapted to bear on the table 1 while the flax or other grain is being collected on the latter, and when the bunch of flax or other grain is to be dropped on the ground, the teeth are simultaneously raised off the table from the position shown in Fig. 1 to that shown in Fig. 2. The opening and closing movement of the flax or other grain dropping mechanism comprised by the table 1 and teeth 2 is effected by an arm 5 fastened on the shaft 3 and suitably connected with means under the control of the operator. The construction thus far described is well known and in common use.

The present invention consists, in combination with the structure above set forth, of a swinging leaf or draw board 5' that extends longitudinally of the table from one end to the other at the lower edge thereof, and this leaf is connected by hinges 6 to the table, so that it can swing between a position at right angles to the table and one parallel therewith, the first being the closed position and the second the open position of the leaf. This leaf is disposed outwardly or below the collecting teeth 2 so as to arrest the loose flax or grain that would tend to pass between the adjacent teeth 2 and drop on the ground as the harvester travels. It will thus be seen that the leaf 5' effects a material increase in the harvested crop, as that portion of the grain that is usually lost is all retained on the table and dropped with the bunch of flax or grain that is collected by the teeth 2. The leaf 5' is adapted to move open simultaneously with the opening movement of the teeth 2, and for this purpose, a suitable operating connection is provided between the leaf 5' and shaft 3. This connection consists of a crank arm 7 fastened to and depending from the shaft 3, and connected with the crank arm 7 is a link or rod 8 which extends to the leaf where it connects with the bracket or strap 9 fastened to the inner or upper face of the leaf 5'. The arm 7 and bracket 9 are located at corresponding ends of the shaft 3 and leaf 5', so that the link 8 will be disposed at the rear end of the flax and other grain attachment and is thus located out of the way so that the collection and deposit of the flax or other grain bunch will not be interfered with. In fact, the link 8 serves to prevent the flax or other grain from dropping off the rear end of the table. At the front end of the table may be provided an upwardly-extending board 10 which prevents flax or other grain from dropping off the front edge of the table. The crank arm 7 and bracket 9 can be provided with spaced openings 11 into which the ends of the rod or link 8 may be engaged so as to effect the proper relative movement of the leaf 5' and teeth 2.

In operation, the flax or grain is delivered to the table as it passes from the sickle mechanism of the harvester and is collected on the table by means of the teeth 2 and leaf 5' until a suitable quantity has been collected to be deposited. The teeth 2 serve to retain the relatively long flax or other grain while the leaf 5' retains the short loose flax or other grain that sifts through the teeth 2. When a bunch of the desired size is formed on the table 1, the operator exerts a pull on the arm 5 and causes the shaft 3 to rock, swinging the teeth 2 upwardly and the leaf 5' downwardly to the position shown in Fig. 2. The flax or other grain collected on the table now slides downwardly off the table and leaf and drops upon the ground. The parts are then immediately restored to the position shown in Fig. 1, so as to collect another bunch of flax or other grain. During the opening movement of the leaf 5', the arm 7 swings in a direction to push the rod 8 longitudinally to swing the leaf downwardly, and during the closing movement, the arm 7 swings in a direction to exert a pull on the rod 8, which returns the leaf 5' to closed position.

A device of this character applied to a flax and other grain attachment is extremely simple and can be readily applied to harvesters already in use, or furnished by the manufacturer with the flax and other grain attachment.

The device materially increases the harvest by reducing the quantity of loose flax or grain ordinarily lost.

This grain saving device is of especial value for harvesting in dry seasons, when the grain is comparatively short and would readily drop through the teeth of the flax attachment of the harvester unless the grain-holding device be used, but the device is, of course, useful in any season to prevent the loss of grain.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention, what I claim as new and desire to secure by Letters Patent, is:—

1. A flax or other grain dropping mechanism for harvesters including a table, teeth for holding long grain while forming into a bunch on the table, means for moving the teeth with respect to the table to permit the bunch of grain to drop off the same, and a leaf extending along the bottom edge of the table below and outside the said teeth for holding on the table the short grain that passes through the teeth and movable simultaneously with the teeth to permit the short grain to drop at the same time the bunch drops off the table.

2. A flax or other grain dropping mechanism for harvesters including a table, teeth for holding long grain while forming into a bunch on the table, means for operating the teeth for dropping the formed bunch, and means mounted independently of the teeth and located below the latter for holding and periodically dropping the short grain that passes through the teeth.

3. A harvester attachment of the class described comprising an inclined table, a set of teeth coöperating with the table for retaining long grain on the table until a bunch is formed, a shaft carrying the teeth and for moving the same to open and closed position to permit the bunch to slip off the table, a leaf normally disposed at an angle to the table at a point below and outside the teeth for retaining on the table the short grain that passes through the teeth, hinges connecting the leaf to the table to permit the leaf to swing downwardly from the lower edge of the latter, an arm on the shaft to move therewith, and a rod connected with the arm and leaf for moving the latter downwardly to drop the short grain at the same time the teeth move to drop the bunch of grain.

4. In a flax or other grain harvester, the combination of a discharge table, teeth for holding the long grain on the table, a single leaf on the table and arranged below and outside the teeth for holding the short loose grain passing through the teeth, and operating means between the teeth and leaf whereby both open and close together to drop the long and short grain simultaneously.

5. A harvester attachment of the class described comprising an inclined table, movable teeth over the table for holding relatively long grain thereon, a leaf hingedly connected with the table at a point below and outside the teeth and normally disposed in a closed position at right angles to the table for holding the short grain that passes through the teeth, said teeth being moved out of engagement with the long grain to permit the same to drop off the table, and means for moving the leaf to open position to permit the short grain to drop off the table with the long grain.

6. A harvester attachment of the class described comprising an inclined discharge table, a plurality of swinging teeth arranged above the table with their free ends disposed adjacent the bottom edge of the table when in closed position, means for moving the teeth toward and from the table, a leaf in the form of a board extending horizontally of the table and so mounted with respect to the table as to swing on an axis located below and outside the free ends of the teeth for holding the grain that passes through the teeth, and means for moving the leaf to and from grain-holding position.

7. In a harvester, the combination of a discharge table, a movable device for holding long grain while forming into a bunch on the table, a second device for holding on the table at a point below the first device the short grain and seed that pass through the latter, and connecting means between the devices whereby they drop the long and short grain off the table at substantially the same time.

8. In a harvester, the combination of a discharge table, means for holding on the table long grain while forming into a bunch and for dropping the formed bunch, a leaf on the table at a point under and outside the said means to hold on the table the short grain and seed that passes through the said means when the latter is in normal grain-holding position, a swinging arm movable with said means, and a connection between the arm and leaf to move the latter to a position to permit the short grain to drop off the table with the long grain.

9. In a harvester, the combination of an inclined discharge table, a grain holding leaf extending from one end thereof to the other and hinged to the bottom edge, a swinging arm, means for swinging the arm, and a connection between the arm and leaf to move the latter to and from grain-holding position.

10. In a harvester, the combination of an inclined discharge table, a grain-holding leaf extending from one end thereof to the other and hinged to the bottom edge, a rock shaft, means for rocking the shaft, an arm on and movable with the shaft, a connection between the arm and leaf to move the leaf to and from grain-holding position by the rocking of the shaft, and grain-holding teeth carried by the shaft and movable toward and from the table by the rocking of the shaft to hold long grain on the table at a point above the leaf and to drop the long grain off the table with the short grain.

11. The combination of a flax or other grain attachment for harvesters including a table, teeth for holding long grain thereon, and means for moving the teeth to permit grain to drop off the table, with means for holding short grain on the table and movable simultaneously with the teeth to permit the short grain to drop with the long grain.

In testimony whereof I affix my signature in presence of two witnesses.

FRANK LINHA.

Witnesses:
CHAS. D. KELSO,
I. M. DODDS.